July 18, 1967

J. H. SEARS ETAL
APPARATUS FOR COATING CONTINUOUSLY
PRODUCED FILAMENTS 3,331,353

Filed Oct. 16, 1964

INVENTORS
JAMES H. SEARS &
KENNETH R. BENTON
BY
*Staehle & Overman*
ATTORNEYS

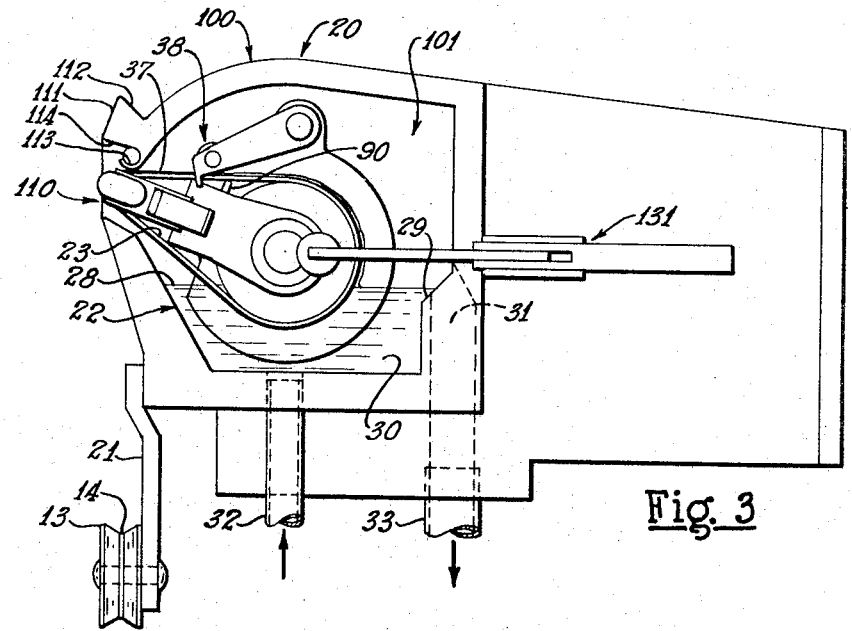
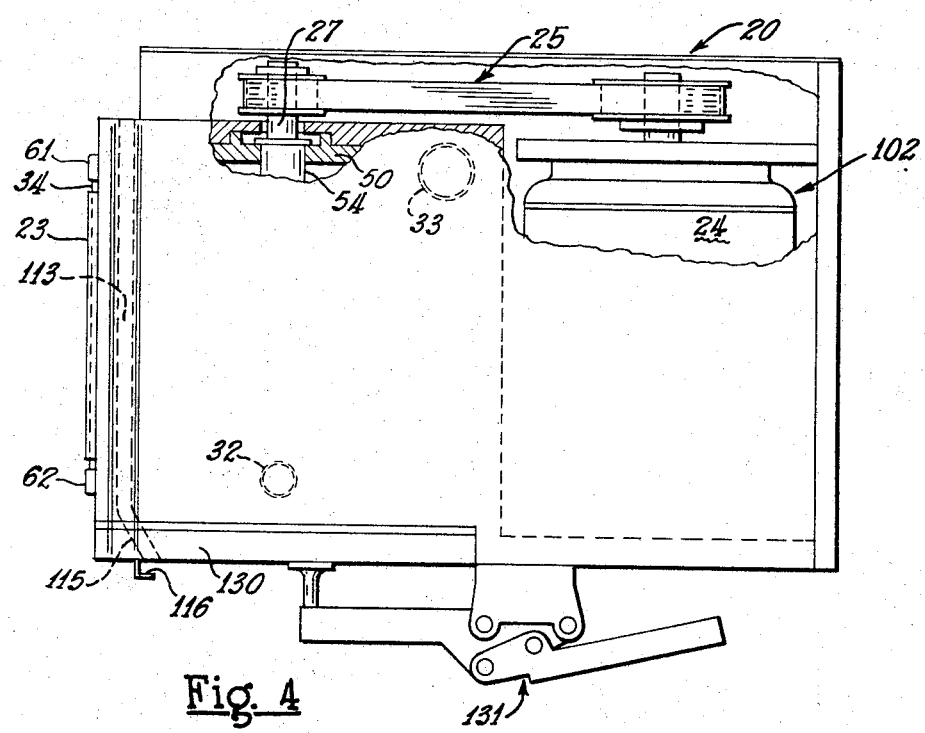

INVENTORS
JAMES H. SEARS &
KENNETH R. BENTON
BY
ATTORNEYS 3,331,353
APPARATUS FOR COATING CONTINUOUSLY
PRODUCED FILAMENTS
James H. Sears and Kenneth R. Benton, Anderson, S.C., assignors to Owens-Corning Fiberglas Corporation, a corporation of Delaware
Filed Oct. 16, 1964, Ser. No. 404,470
19 Claims. (Cl. 118—257)

This invention relates to an apparatus for applying a liquid coating to longitudinally moving, continuous, filamentary materials and, more particularly to improvements in those portions of the apparatus which pick up and transfer the liquid coating material from a supply to the filamentary material itself and to the housing for such apparatus.

In describing the instant invention it will be disclosed and illustrated in connection with the application of a coating material to a group of continuous glass filaments or fibers which are simultaneously produced and then laterally grouped together to form a continuous glass fiber strand. Continuous glass fiber strands in many commercial installations are produced by maintaining a supply of molten glass in a glass melter or "bushing" which has a plurality of minute orifices distributed over its bottom. A fine stream of glass flows through each of the orifices and the cooling streams are longitudinally drawn at high speeds to attenuate them into glass fibers. Commercial bushings usually have upwards of 200 or more orifices or tips through each of which an individual filament is pulled and the filaments are combined by lateral association to form a single strand. The 200 or more orifices or tips are spaced over a considerable area and the filaments, therefore, extend in the shape of a fan leading from the spaced orifices to a guide or gathering shoe.

In order to insure the application of a size, lubricant, or other coating to each of the filaments applicators of many different types have been devised which transfer the liquid coating material to the filaments before they are associated into a strand or at the time of their association together to form a strand. In order to insure that each of the 200 or more filaments in the strand is individually coated it is preferable to apply the liquid coating to the filaments before they are associated together in strand form. Coating apparatus of this general type is disclosed in Patent No. 2,873,718, issued February 17, 1959. While the apparatus shown in the above-noted patent is generally satisfactory there have been some difficulties in the areas of belt moving means maintaining their alignment, removal and installation of belt means, entanglement problems from exposed rotating components, drainage of water shaken from the filamentary material, and other problems which will be discussed hereinafter.

The instant invention therefore has as its primary object the provision of improved means or apparatus for applying the liquid coating to each of the individual filaments prior to their association in a strand.

It is a further object of this invention to provide an improved apparatus for applying a liquid coating to a group of continuous filaments which prevents water dilution of the liquid coating being applied and is substantially maintenance free for extended periods of time, while affording an improved ease of maintenance whenever maintenance is required.

The invention features apparatus for the above-described purpose which includes a liquid supply tank, a first roller means journaled on a horizontal axis and positioned with at least a portion of its periphery beneath the surface of a supply of liquid in the tank and framework means for supporting the first roller means which includes a first yoke means having bearing means in each arm for journaling the first roller means. There is also provided nose bar roller means and framework means including a second yoke means which has bearing means in each arm for journaling the nose bar roller means in parallel relationship with the first roller means. A continuous belt extends around the first and nose bar roller means and means are shown for driving one of the roller means. A first side of the second yoke means is pivotable and a second side of the second yoke means includes a collapsible locking means for securing the nose bar means in a parallel relationship with the roller means when in a locked position, while allowing movement of one of the nose bar means toward the roller in a collapsed position thereby facilitating installation and removal of the belt without tearing of the belt. A metering bar means is described which is pivotally mounted above the belt means and is pivoted into metering contact therewith after installation of the belt. The metering bar means has guide arm means dependent therefrom for guiding the tracking of the belt means on the first and nose bar roller means. The metering bar means comprises in the preferred embodiment a rotatable mounted cylindrical member, having helical grooves formed in its periphery, which rotates freely when in contact with the belt. A stripper bar is advantageously positioned inside the loop of and in contact with the belt to remove the liquid from the inside thereof. The stripper bar is advantageously in contact with the inside of the belt loop prior to the contact of the metering bar and is operative to raise the belt to insure proper metering contact by the metering bar.

In the preferred embodiment the roller means may be supported on a shaft journaled in bearing means set in the yoke means. In order to avoid entanglement or the wrapping of loose filaments that may break and fall on any exposed rotating components other than the roller means itself, a cavity may be formed in the roller means at each end thereof around the shaft and stationary enclosing flanges may surround the shaft and extend from either the yoke or the bearing means into the cavity. The stationary enclosing flanges are preferably extensions of the bushings and may act as bearing surfaces themselves.

The collapsible locking means preferably comprises a pivotally mounted trigger means having a cam surface formed thereon for urging the nose bar means into the parallel relationship noted hereinbefore in response to the pivoting of the trigger. The trigger means advantageously abuts against a shoulder formed on the second yoke means on reaching the parallel and locking position. The nose bar means may have flanged means extending therefrom, and the yoke means may have slot means formed therein to receive the flanged means when the nose bar means is in a collapsed position, the slot and flanged means cooperating to position the nose bar means to receive the cam surface of the trigger means. The flange means extending from the nose bar means may form a trigger receiving slot to guide the cam surface of the trigger.

A novel housing is disclosed which has the liquid supply tank formed in the bottom thereof, which housing substantially encloses the belt and associated equipment. The housing has an elongated horizontally extending aperture formed therein and the nose bar means is positioned to extend therethrough to provide an exposed contact area on the belt for the filamentary material. The housing is preferably formed from glass fiber reinforced plastic which in combination with the substantial enclosure of the apparatus and tank is operative to maintain the liquid supply at a desired temperature and insulated from the ambient atmosphere. The housing preferably has one entire side enclosed by a transparent door means so that the operation of the apparatus as well as the level of the liquid supply may be easily ascertained. This also enables the molding of the housing in one piece and facilitates entrance to the housing for cleaning and for belt removal and installation.

The housing has a configuration formed in the upper side of the aperture to effect drainage of water shaken from the filaments. This includes a lip extending toward the filaments to form a trough with the housing to drain part of the water, the lip being spaced far enough from the filaments to avoid contact by vibration of filaments but spaced close enough to prevent water being blown onto the belt or applicator. The configuration further includes a second trough formed in the housing beneath and communicating with the under side of the lip to drain water collected on the front and under sides of said lip. If the housing is not formed of the glass fiber reinforced plastic described above, the lip is preferably coated of a material on which an even wetting action will occur causing the water to flow evenly into the second trough. The under side of the lip is preferably inclined at least 15° but not more than 30° from the horizontal to insure a proper flow of water into the second trough. The second trough is spaced far enough from the forwardmost portion of the lip to prevent water being sucked out of the trough by the high speed passage of the filaments, but is not spaced too far in order to avoid the water dripping from the underside of the lip instead of running into the second trough. The bottom of the second trough is spaced close enough to the belt or applicator to prevent water being blown back into the housing but is spaced far enough from the belt to avoid contact with the liquid supply being carried on the belt or the applicator.

Other objects, advantages, and features of the invention will become apparent when the following description is taken in conjunction with the accompanying drawings, in which:

FIG. 3 is a view taken from the right of the apparatus of FIG. 2;

FIG. 4 is a plan view of the apparatus illustrated in FIG. 3;

Figure 1:
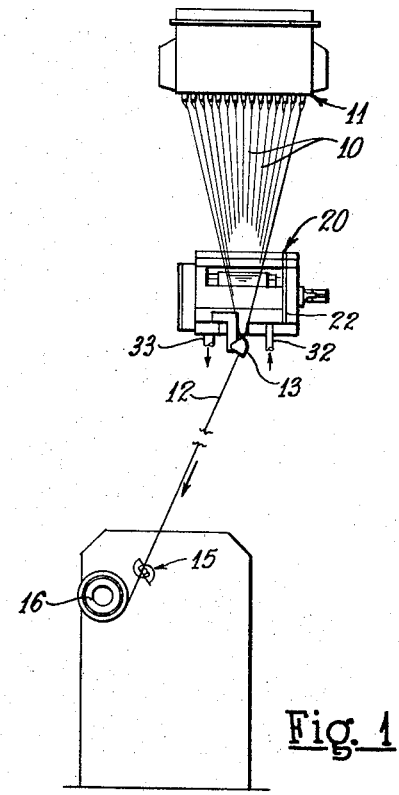
FIG. 1 is a fragmentary, somewhat diagrammatic view in elevation of apparatus embodying the invention as combined with filament forming and strand winding apparatus known in the art.

A multifilament, continuous glass fiber strand may be formed from a plurality of individual fibers 10 attenuated from fine streams of glass which flow through a corresponding number of orifices in the bottom of a glass melter or bushing generally indicated at 11. It will be observed in FIG. 1 that the fibers or filaments 10 extend in a plurality of lateral rows because of the necessity for laterally spacing the individual orifices from which they are pulled. In FIG. 1 the filaments 10 are illustrated as extending transversely across the bushing 11 with, say, 50 or more in each individual row and with a plurality of rows of filament orifices.

In order to associate the plurality of individual filaments 10 to form a multifilament strand 12 they are led through a guide generally indicated at 13 and shown in the drawings as having a recessed V-shaped groove 14 in its arcuate edge.

After association of the filaments 10 to form the strand 12 the strand may be led downwardly through a traverse 15 and onto the exterior of a rotary spool generally indicated at 16 for winding the continuous strand to form a package of strand from which it can subsequently be unwound by conventional textile or other machinery.

Apparatus embodying the invention is generally indicated in the drawings by the reference number 20 and includes the guide 13, a coating material supply tank 22, a coating transfer belt generally indicated at 23 and the necessary apparatus for driving the transfer belt 23 including a motor 24 and power connection means as generally indicated at 25 which may include belt and pulley means.

The transfer belt 23 is mounted upon a crowned drum or roller 26 which is, in turn, supported by shaft 27 driven from the power connecting means 25 and extending horizontally over the liquid material supply tank 22 (see FIG. 3) at such a level that the peripheral surface of the drum or roller 26 dips beneath the level of a supply of coating material generally indicated at 28 in the tank 22. The level of the coating material 28 is maintained by a weir 29 extending transversely across the tank 22 and separating the tank 22 into a supply compartment 30 and a overflow compartment 31. A coating material input line 32 leads to the bottom of the supply compartment 30 and a return line 33 leads from the overflow compartment 31 to a pump and supply for the coating material 28, not shown in the drawings.

Figure 2:
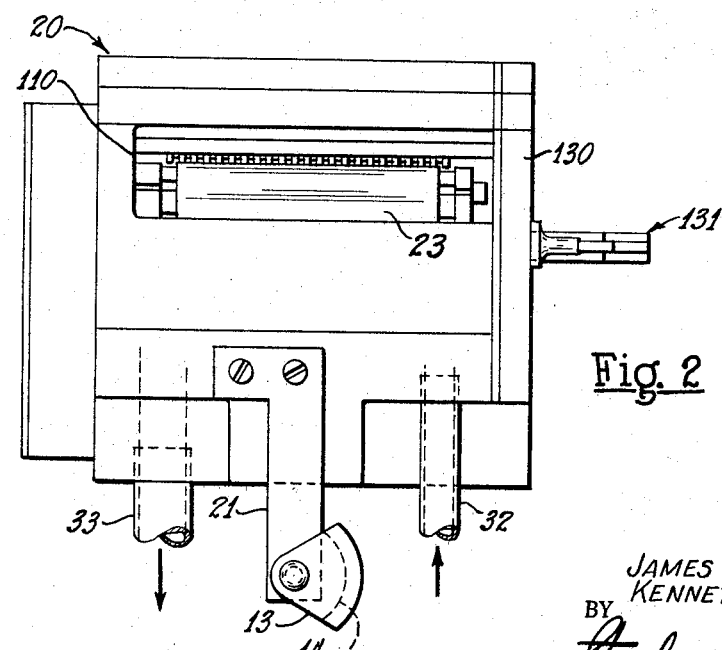
FIG. 2 is an enlarged view in elevation showing only the strand coating apparatus embodying the invention.
Figure 5:
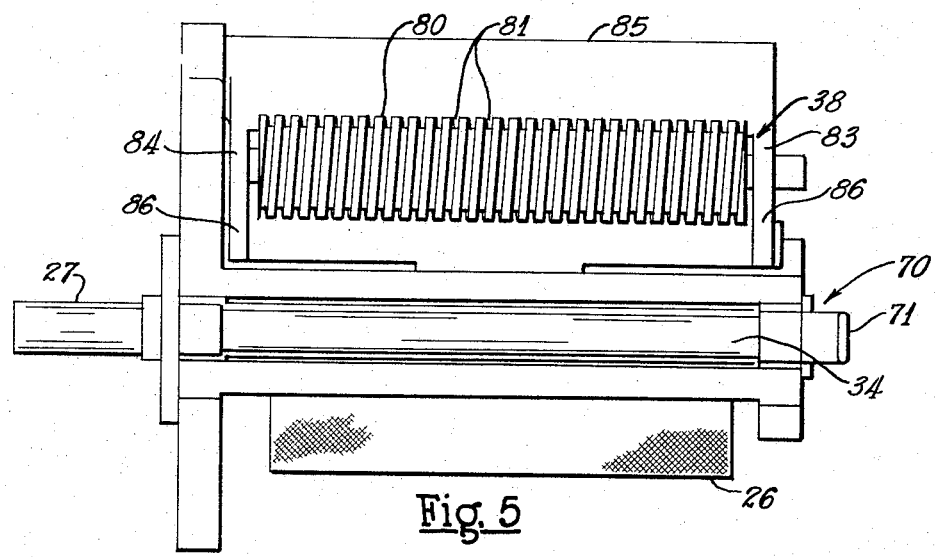
FIG. 5 is a front elevational view of the belt supporting and metering portion of the apparatus.

The belt 23 is also engaged over a nose or guide bar 34 mounted in the framework generally indicated at 50 and extending parallel to the axis of the drum or roller 26 above and in front of the supply tank 22. As can best be observed in FIG. 3 when the belt 23 is in position on the drum or roller 26 and nose bar 34, the front edge of the belt is vertically positioned directly above the apex of the V-shaped slot 14 in the guide 13. The guide 13 is adjustably positioned in the bracket 21 in order that the apex of the slot 14 may be laterally positioned relative to the width of the belt 23 so that the fan of filaments 10 at the point of engagement with the belt 23 will lie at one side of the center of the belt as can best be seen in FIGS. 1 and 2.

In operation, the drum or roller 26 is rotated at constant speed so that the belt 23 is moved through the pool of coating material 28 and picks up a layer of the coating substance on its outer surface. The layer of coating material generally indicated at 37 is leveled and metered by a metering bar means 38, if desired, and is carried forward across a span of the belt 23 and around the nose bar means 34 moving in the same direction around the nose bar 34 as the filaments 10. The filaments 10 wipe through the layer of coating material 37 with a controlled quantity of the material adhering to each of the filaments 10 as that filament is submerged in and pulled out of the coating 37. The quantity of material adhering to each of the filaments 10 is referred to as "controlled" because by proper coordination and relationship of the viscosity, temperature and other characteristics of the coating material, the metering of the material, and the lineal speeds of the belt 23 and filaments 10, a uniform thin coating of material is continuously transferred to or picked up by the filaments 10.

Referring to FIGS. 5 through 8, the belt carrying and metering apparatus is shown in greater detail. In prior art apparatus the nose bar guide means and the pick up roller means have each been cantilevered, that is, supported by bearing surface or support means at only one end, and thus there has been difficulty in maintaining the parallel relationship desired, maintaining the belt in the proper tracking relationship, and problems arising with the entanglement of loose filaments with any rotating components that are exposed. These problems are overcome in the instant invention by the provision of the following means. A framework generally indicated at 50 has a first yoke means with arms 51 and 52 for supporting the roller means 26. Bushing means 54 and 55 are set in arms 51, 52 and journally support shaft 27 upon which roller 26 is mounted. Enclosing flanges 56 and 57 surround the shaft 27 and extend into cavities 58, 59 formed in the ends of the roller means 26 around the shaft 27. The extending flanges 56, 57 are advantageously a portion of the bushings 54, 55 and provide internal bearing surfaces. However, the flanges 56, 57 may be other suitable protective assemblies. In order to assemble the roller 26 into its operative position the roller 26 may be placed in the position shown in FIG. 8 and bushings 54 and 55 press fitted into place. Shaft 27 is then inserted through the bushings 54, 55 and may be retained in place by suitable means such as a washer and snap ring configuration that fits into a key groove on the shaft 27. The roller 26 may be retained in a stationary position with respect to the shaft by the use of a set screw cooperating with a flattened portion of the shaft 27 as is generally indicated at 53. By using this arrangement it will be noted that no rotating components other than the roller itself are exposed, so that filaments may not become wrapped around or entangled with the rotating shaft 27.

The framework 50 also includes a second yoke means generally indicated at 60 having first and second arms 61 and 62. The nose bar means 34 is preferably journaled in arms 61 and 62 in parallel relationship with respect to roller means 26. However, the nose bar means 34 may be held in a stationary position if desired and be formed with a smooth, curved outer surface so that the transfer belt 23 may be slidingly driven over the nose bar 34 by means of the roller 26. While this arrangement avoids having to clean nose bar bearings, the belt will wear more quickly. Side 61 of the yoke 60 is pivotable at pin 63 mounted on framework 50 so that the side or arm 62 may collapse toward the roller 26 by use of a collapsible locking means generally indicated at 70. A trigger 71 is pivotally mounted on pin 72 attached to framework 50. When in the locked position the trigger 71 abuts against a shoulder 73 formed on the framework 50. A cam surface 74 is formed on the trigger 71 to aid in urging the nose bar means to the parallel relationship desired. A pair of flanges 75 extend from the arm 62 to form a slot to receive the cam surface 74 of the trigger 71. A slot 76 is formed in the framework 50 to receive the flanges 75 when the nose bar is in the collapsed position so that the slot formed by the flanges 75 will be in the proper position to receive the trigger 71 when it is urged into the locking position. The assembly just described affords the advantage of collapsing the nose bar toward the roller means so that the belt 23 may be quickly and easily placed on or removed from its desired position without stretching or tearing the belt. Because there is a crown formed on the roller 26 the belt may be installed while the roller 26 is rotating and the crowned portion will be operative to generally center the belt 23.

The metering bar means generally indicated at 38 comprises a cylindrical roller 80 advantageously having helical grooves 81 formed therein to properly meter the liquid supply. The cylinder 80 is rotatably mounted at 82 in support arms 83, 84 which form a portion of a cantilevered pivoting meter bar framework 85. The framework 85 is positioned to be rotated out of the way during the installation of belt 23. A pair of guide arms 86 depend below the cylindrical roller 80 and are adapted to guide the belt 23 in its proper tracking position over nose bar means 34 and roller means 26.

Figure 6:
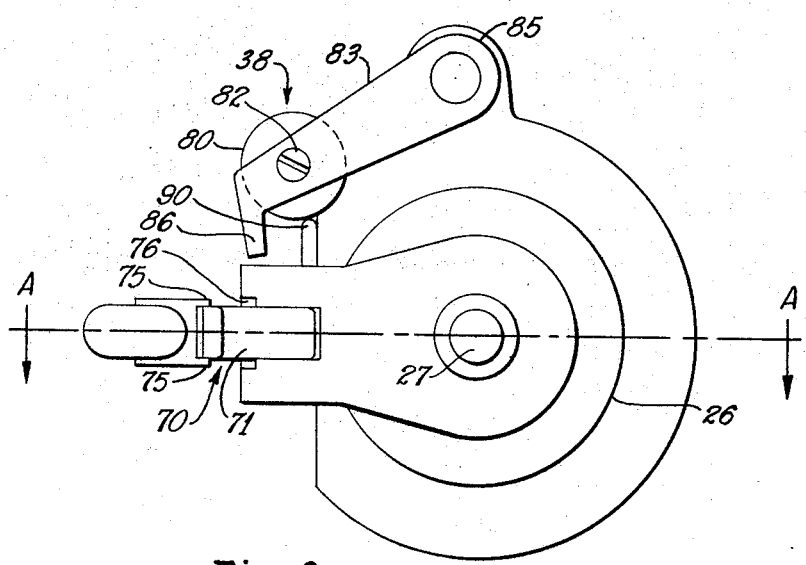
FIG. 6 is a view in elevation of the apparatus of FIG. 5 taken from the right.
Figure 7:
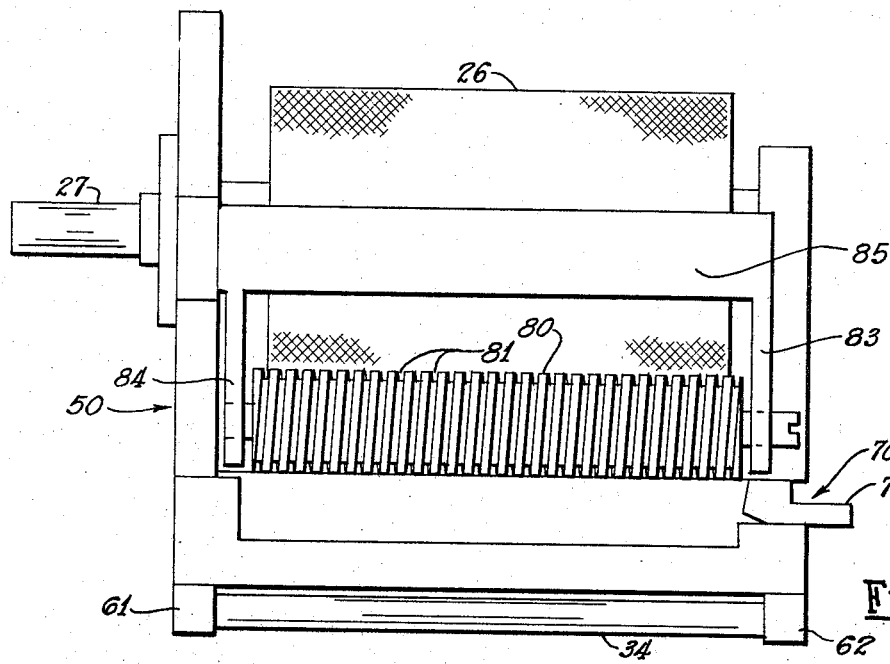
FIG. 7 is a plan view of the apparatus of FIG. 5.
Figure 8:
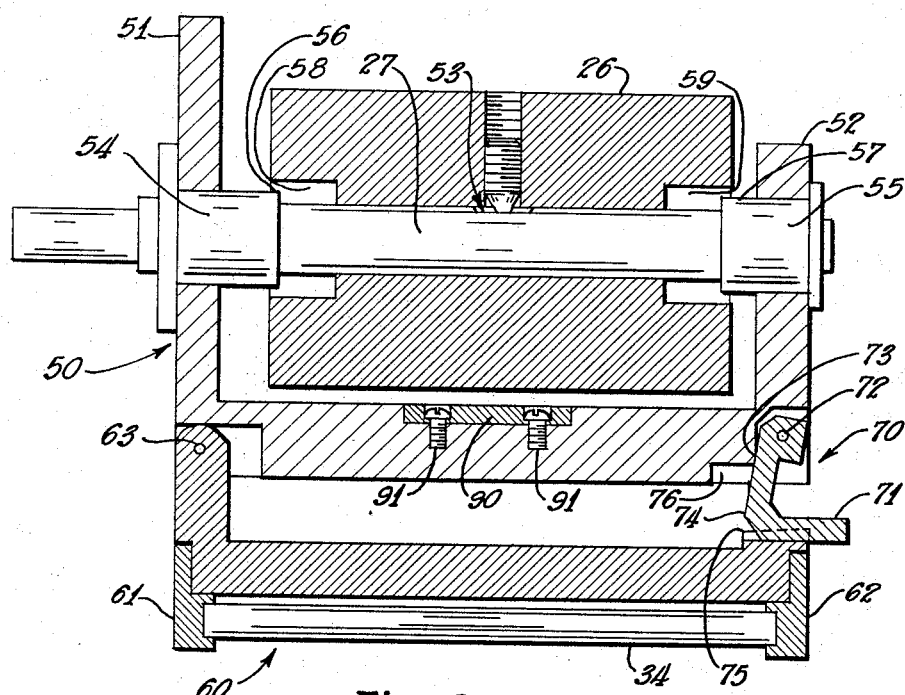
FIG. 8 is a sectional view of the apparatus of FIG. 6 taken at lines A—A.

A stripper bar means 90 is mounted by suitable attaching means 91 (FIGS. 6 and 8) to the framework 50 and is positioned to be on the inside of the loop formed by the belt 23 to strip from the inside of the loop any excess of the liquid supply material. As best seen in FIG. 6 the stripper bar 90 will contact the belt 23 at a position just prior to the metering contact of the cylinder 80 and is advantageously operative to raise the belt 23 to insure both a better stripping of the material from the inside of the belt as well as a better contact of the metering bar 80 with the exterior surface of the loop of the belt 23.

Referring again to FIGS. 2 through 4, the novel housing of the instant invention will now be described. The housing is generally indicated at 100 and has an applicator compartment 101 and a motor compartment 102. The liquid supply tank 22 is advantageously formed within the applicator compartment 101 and has been described. The housing substantially encloses the applicator equipment and is advantageously formed from glass fiber reinforced plastic which, in combination with the substantial enclosure of the apparatus and the liquid supply tank, is operative to maintain the liquid supply at a desired temperature and insulated from the ambient atmosphere. An elongated, horizontally extending aperture generally indicated at 110 is formed in the housing. The nose bar means 34 is positioned to extend through the aperture 110 to provide an exposed contact area on the belt 23 for the filamentary material.

The housing may be formed so that one entire side is closed by a door means 130 which enables the molding of the housing in one piece and facilitates entrance to the housing for maintenance and for belt removal and installation. The door means 130 is preferably of a transparent material such as an acrylic plastic so that the operation of the applicator equipment and the level of the sizing material may be ascertained without opening the door. A door closing and opening means is generally indicated at 131 and may comprise a locking toggle clamp that is well known in the art.

When glass fibers or other continuous filaments are formed extraneous water or other liquids may collect on the filaments between the time of formation and arrival at an applicator. Because of the speed of passage of the filaments a negative pressure area exists in the aperture above the belt producing a tendency to pull or blow the liquid toward the belt and the inside of the housing. A configuration is formed in the upper side of the aperture 110, to effect drainage of the extraneous liquid shaken from the filaments, which comprises a lip 111 extending toward the filaments and which also forms a trough 112 with the housing to drain part of the water or extraneous liquid away. The lip 111 is spaced far enough from the filaments to avoid contact by vibration of the filaments but spaced close enough to prevent water from being blown onto the belt 23. Experiments have indicated that this spacing of the lip from the filaments is advantageously between 3/32 and 5/32 of an inch. The configuration further includes a second trough 113 formed in the housing 100 beneath and communicating with the under side 114 of the lip to drain water or extraneous liquid collected on the front and under side of the lip 111. If the entire housing is not formed of the glass fiber reinforced plastic described above, the lip advantageously is formed of or coated with a material on which an even wetting action will occur so that the water will flow evenly into the second trough 113 and not form drops which will fall on belt 23. The trough 113 may include a portion 115 (best seen in FIG. 4) which is angled away from the filaments so that passage of the filaments will not pull the water draining from trough portion 115 toward the strands. Rather than inclining the portion 115 away from the filamentary material, or in conjunction with the inclining of the portion 115 of the trough 113 away from the filamentary material a shield 116 may be installed at the trough outlet to prevent the water being drawn back onto the filamentary material. The trough is sloped toward its drainage point.

The under side 114 of the lip 111 is advantageously inclined at least 15° from the horizontal but not more than 30° to insure a proper flow of the water collected on the under side 114 of the lip 111 into the second trough 113. If the inclination is too small the water will not run into trough 113 but will form droplets which will fall on belt 23. If the inclination is too large the velocity of the water running into trough 113 will be too high and it will spill over the front of the trough onto the belt 23.

The bottom of the trough 113 is spaced close enough to the belt 23 to prevent water being blown back into the housing 100, but is spaced far enough from the belt 23 to avoid contact with the liquid supply 37 being carried on the belt 23. Experiments have indicated that this spacing is advantageously approximately 3/16 of an inch. The trough 113 must also be spaced far enough from the forwardmost portion of the lip 111 to prevent water being sucked out of the trough by the passage of the filaments, but not spaced too far in order to avoid the water dripping from the under side 114 of the lip 111 instead of running into the trough 113. Experiments have indicated that the most advantageous spacing of the trough is approximately 3/8 of an inch from the center line of the trough to the filaments. The spacing discussed may vary with speed of passage of the filaments, the type of extraneous liquid, etc.

In summary, the double-yoke construction of the preferred embodiment enables better control of the application of the liquid supply. The floating metering means avoids the probability of the exertion of uneven pressures on the belt and thus avoids uneven metering. The collapsible noise bar means allows the removal and installation of belts without stretching and also allows installation while the drive roller is running. The nose bar may be fixed or rotatable. If the bar is rotatable then the bearing means will become dirty and require cleaning, but the friction will be reduced and therefore the motor power requirements will be reduced. A housing has been disclosed with several novel features described hereinbefore, along with the advantage of being able to enclose the motor in a separate compartment and prevent the accumulation of moisture, sizing material and other dirt in the motor or the power connecting means. The housing may be molded in one piece without square corners on the interior facilitating the cleaning thereof.

It is apparent that, within the scope of this invention, modifications and different arrangements may be made other than as herein disclosed, and the present disclosure is illustrative merely, the invention comprehending all variations thereof.

We claim:

1. Apparatus for applying a liquid coating to longitudinally moving, continuous, filamentary material, said apparatus comprising, in combination, a liquid supply tank, a driven roller means journaled on an axis and positioned with at least a portion of its periphery beneath the surface of a supply of liquid in said tank, framework means for supporting said driven roller means including rearwardly extending yoke means having arm means and bearing means in each yoke arm for journaling said driven roller means, nose bar means, said framework also including forwardly extending yoke means for supporting and retaining said nose bar means in parallel relationship with said roller means, a continuous belt extending around said roller means and nose bar means and driven by said roller means, said forwardly extending yoke means having one arm which is pivotally mounted on said framework and a second arm which includes a collapsible locking means for securing said nose bar means in said parallel relationship with said roller means in a locked position and for allowing movement of one end of said nose bar means toward said roller in a collapsed position, thereby facilitating installation and removal of said belt over said driven roller, nose bar and said two yoke means without stretching or tearing said belt.

2. Apparatus as defined in claim 1 which further includes a cantilevered support above said belt and metering bar means pivotally mounted on said support above said belt means for pivoted rotation into metering contact therewith after installation of said belt.

3. Apparatus as defined in claim 1 in which said driven roller means is supported on a shaft journaled in bearing means set in said yoke means, said roller means having a cavity formed therein at each end around said shaft, stationary enclosing flanges at each end of and surrounding said shaft and extending from one of said bearing and yoke means at each end of said shaft into the corresponding cavity of said roller means thereby avoiding exposure of rotating components to prevent wrapping and entangling of loose filaments.

4. Apparatus as defined in claim 3 in which said bearing means are bushings and said stationary enclosing flanges are extensions of said bushings.

5. Apparatus as defined in claim 1 in which said collapsible locking means comprises a pivotally mounted trigger means having a cam surface formed thereon for urging said nose bar means into said parallel relation in response to the pivoting of said trigger.

6. Apparatus as defined in claim 5 in which said trigger means is positioned to abut against a shoulder formed on said forwardly extending yoke means on reaching said parallel and locking position.

7. Apparatus as defined in claim 5 in which a slot is formed in said nose bar means to receive and guide said cam surface of said triggering means.

8. Apparatus as defined in claim 5 in which said nose bar means has flange means extending therefrom and said forwardly extending yoke means has slot means formed therein to receive said flange means when said nose bar means is in a collapsed position, said slot and flange means cooperating to position said nose bar means to receive said cam surface of said trigger means.

9. Apparatus as defined in claim 1 in which said liquid supply tank is formed in the bottom of a housing substantially enclosing said belt and associated equipment, said housing having an elongated, horizontally extending aperture formed therein, said nose bar means positioned to extend through said aperture to provide an exposed contact area on said belt for said filamentary material, said housing being formed from glass fiber reinforced plastic which in combination with said substantial enclosure of the apparatus and tank is operative to maintain said liquid supply at a desired temperature and insulated from the ambient atmosphere.

10. Apparatus as defined in claim 9 in which said housing has one entire side closed by a door means enabling the molding of said housing in one piece and facilitating entrance to the housing for cleaning and for belt removal and installation.

11. Apparatus as defined in claim 1 in which said liquid supply tank is formed in the bottom of a housing substantially enclosing said belt and associated equipment, said housing having an elonagted, horizontally extending aperture formed in a wall thereof, said nose bar means positioned to extend through said aperture to provide an exposed contact area on said belt for said filamentary material, said housing has a configuration formed in the upper side of said aperture to effect drainage of water shaken from said filaments, comprising a lip extending toward said filaments forming a trough with said housing to drain part of said water, said lip being spaced far enough from said filaments to avoid contact by vibration of filaments, but spaced close enough to prevent water being blown onto said belt.

12. Apparatus as defined in claim 11 in which said configuration further includes a second trough formed in said housing beneath and communicating with the under side of said lip to drain water collected on the front and under side of said lip.

13. Apparatus as defined in claim 12 in which said lip is formed of a material on which an even wetting action will occur and water will flow evenly into said second trough.

14. Apparatus as defined in claim 12 in which the under side of said lip is inclined at least 15° from the horizontal to insure proper flow of water into said second trough.

15. Apparatus as defined in claim 12 in which the under side of said lip is inclined less than 30° from the horizontal to insure that the velocity of water flow into said second trough is not too great.

16. Apparatus as defined in claim 12 wherein the bottom of said second trough is spaced close enough to said belt to prevent water being blown back into the housing, but is spaced far enough from said belt to avoid contact with the liquid supply being carried on the belt.

17. Apparatus as defined in claim 12 wherein said second trough is spaced far enough from the forwardmost portion of said lip to prevent water being sucked out of said trough by the passage of said filaments, but not spaced too far from the forwardmost portion of said lip in order to avoid the water dripping from the underside of said lip instead of running into said second trough.

18. A housing for apparatus for applying a liquid coating to longitudinally moving, continuous, filamentary material which includes a liquid applicator and means for supplying liquid thereto, said housing substantially enclosing said apparatus and having an elongated, horizontal extending aperture formed therein and having an upper side to allow the protrusion of said liquid applicator therethrough to provide a contact area for said filamentary material, said housing having a configuration formed in the upper side of said aperture to effect drainage of water shaken from said filamentary material including a lip having a front and under side and extending toward said filamentary material forming a trough, said configuration further including a second trough formed in said housing beneath and communicating with the under side of said lip to drain water collected on the front and under side thereof.

19. A housing as defined in claim 18 in which the under side of said lip is inclined at least 15° but not more than 30° from the horizontal to further insure proper flow of water into said second trough.

References Cited

UNITED STATES PATENTS

| | | | |
|---|---|---|---|
| 807,685 | 12/1905 | Pelham | 118—257 |
| 1,110,380 | 9/1914 | Crowell | 118—257 X |
| 1,124,506 | 1/1915 | Nicholls | 118—70 |
| 1,763,363 | 6/1930 | Moller. | |
| 2,219,979 | 10/1940 | Case | 118—257 |
| 2,758,738 | 8/1956 | Wynn | 118—257 X |
| 2,873,718 | 2/1959 | Brautigam | 118—257 X |

FOREIGN PATENTS 384,198  1/1907  France.

CHARLES A. WILLMUTH, *Primary Examiner.*

J. P. McINTOSH, *Assistant Examiner.*